(No Model.)
O. C. VAN NESS.
HARROW.
No. 353,611. Patented Nov. 30, 1886.
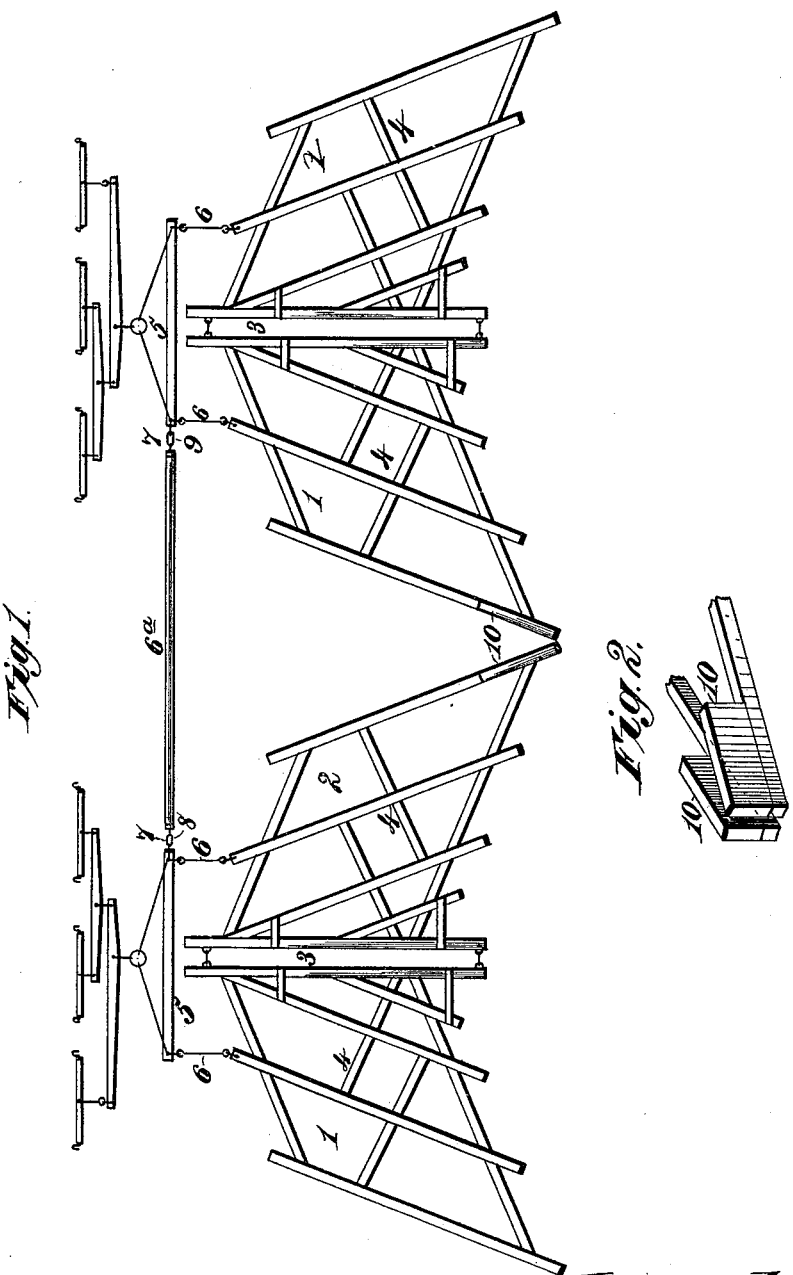
Witnesses.
Robert Everett
Geo. W. Rea
Inventor.
Orrin C. Van Ness,
By James L. Norris.
Atty.

UNITED STATES PATENT OFFICE.

ORRIN C. VAN NESS, OF POMME DE TERRE, ASSIGNOR OF ONE-HALF TO PETER WINSOR, OF FERGUS FALLS, MINNESOTA.

HARROW.

SPECIFICATION forming part of Letters Patent No. 353,611, dated November 30, 1886.

Application filed July 26, 1886. Serial No. 209,118. (No model.)

*To all whom it may concern:*

Be it known that I, ORRIN C. VAN NESS, a citizen of the United States, residing at Pomme de Terre, in the county of Grant and State of Minnesota, have invented new and useful Improvements in Harrows, of which the following is a specification.

This invention relates to flexible harrows in which each harrow-frame is complete in itself; and it has for its object to provide novel means for so coupling the harrow-frames that while one may work in advance of the other it will maintain its normal position with reference to the line of draft, whereby the harrow is prevented from "tracking" if one team should move faster than the other.

The invention also has for its object to provide novel means for preventing the coupled harrows from riding one upon the other at their rear adjacent ends.

The objects of my invention I accomplish in the manner and by the peculiar construction and combination of devices hereinafter described and claimed, reference being made to the accompanying drawings, in which—

Figure 1 represents a plan view of two complete harrow-frames coupled together according to my invention, and Fig. 2 a detail view of the blocks for preventing the rear adjacent ends of the frames from riding one upon the other.

In order to enable those skilled in the art to make and use my invention, I will now describe the same in detail, referring to the drawings, where it will be seen that each harrow-frame comprises two sections, 1 and 2, hinged or jointed together along the longitudinal line 3, so that the sections of the frame will conform themselves to the undulatory character of the surface traversed. The frames will be provided with teeth of any known or desired construction, and the sections of the frame are relatively arranged to extend obliquely in a rearward direction, while the end tooth-bars, 4, of each frame extend obliquely in opposite directions with reference to the line of draft, for a purpose hereinafter explained. A double-tree, 5, is connected by end draft-links, 6, with the respective sections 1 and 2 of each harrow-frame, and with the double-tree is connected means ordinarily provided in harrows for employing a double team or six horses—that is, either two or three horses for each complete harrow-frame.

The inner ends of the two double-trees are directly jointed to the ends of a continuous and single coupling-pole, 6ª, and these joints 7 may be the simple pivotal connections, as shown in the drawings, comprising links 8 and 9, or they may be of any other suitable construction, so long as the coupling-pole is, in the normal position of the harrows, as shown, maintained in line, or approximately so, with the double-trees.

The coupling-pole, jointed at its ends directly to the ends of the double-trees, preserves the substantial parallelism of the two coupled harrow-frames, while at the same time maintains its normal position with reference to the line of draft, thus preventing the teeth from tracking if one team should move faster than the other. The coupling-pole also holds the two frames from being pulled by the teams away from each other at their forward ends.

The rearward oblique arrangement of the jointed sections of each frame, hereinbefore referred to, prevents either from coming in contact with the coupling-pole when turning, and by the oblique arrangement of the end bars, 4, if one team should pull toward the other, sufficient room is provided for one frame to pass up beside the other. The arrangement described also causes the harrows to work close to the ground, so that the teeth of the outside bars will perform as good work as the teeth of the inside bars.

To the rear ends of the inner adjacent bars of the frames are secured wooden or metallic upwardly-projecting blocks 10, which in practice are about eighteen inches long and six inches high. As they rise from the said end bars it will be evident that the coupled frames cannot ride each other. The frames can be uncoupled by detaching the coupling-pole, and each harrow used alone, and whether coupled or uncoupled each frame may be drawn by two or three horses.

I am well aware that flexible harrows are not broadly new, and also that three harrow-frames, each of itself rigid, have been connected by draft-links and stretcher-rods at the front, the whiffletrees being jointed to the draft-links; but such I do not claim.

Having thus described my invention, what I claim is—

1. The combination of the harrow-frames, each complete in itself and comprising flexibly-connected sections 1 and 2, a double-tree connected with each frame by end links, which are secured, respectively, to the sections of the frame, and a continuous single coupling-pole, having its ends jointed directly to the inner ends of the double-trees, substantially as and for the purpose described.

2. The combination of the harrow-frames, each complete in itself and comprising two flexibly-connected sections, 1 and 2, which extend rearward in oblique directions with the inner adjacent end bars of the frames arranged obliquely in opposite directions with reference to the line of draft, a double-tree connected with each frame by end links, which are secured, respectively, to the sections of the frame, and a single continuous coupling-pole having its ends jointed directly to the inner ends of the double-tree, substantially as and for the purpose described.

3. The combination, with the harrow-frames, each comprising two flexibly-united sections, the double-trees, and the coupling-pole jointed directly thereto, of the blocks rising from the rear ends of the adjacent end bars of the frames to prevent the latter from riding each other, substantially as described.

In testimony whereof I affix my signature in presence of two witnesses.

ORRIN C. VAN NESS.

Witnesses:
P. WINSOR,
FRANK WATERS.